July 15, 1952  F. S. MARTIN  2,603,700
PORTABLE TRAFFIC CONTROL LIGHT
Filed Dec. 20, 1948  2 SHEETS—SHEET 1
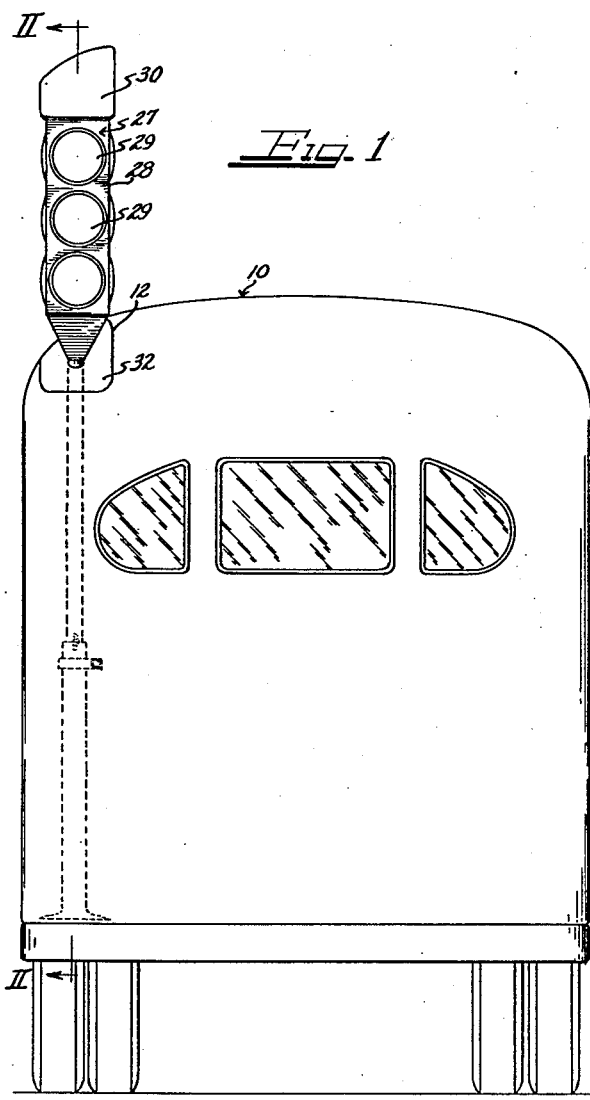
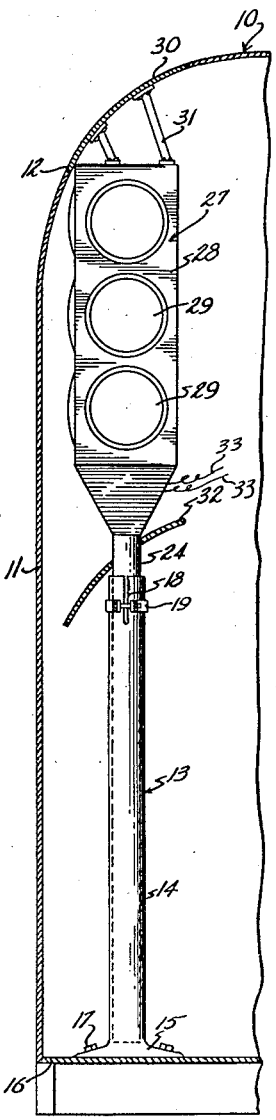
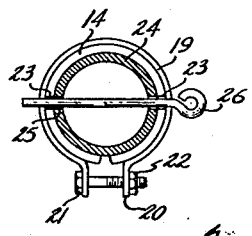
Inventor
FRED S. MARTIN July 15, 1952        F. S. MARTIN        2,603,700
PORTABLE TRAFFIC CONTROL LIGHT
Filed Dec. 20, 1948        2 SHEETS—SHEET 2
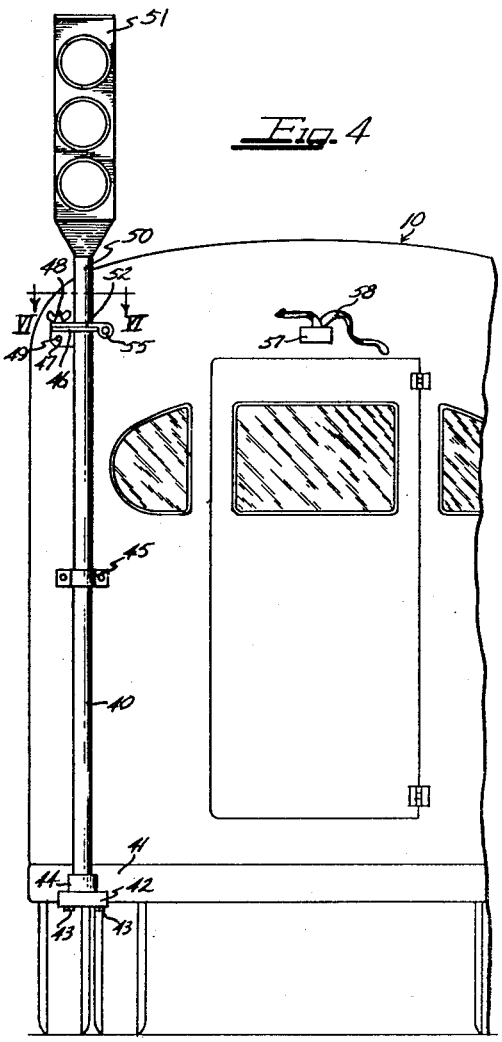
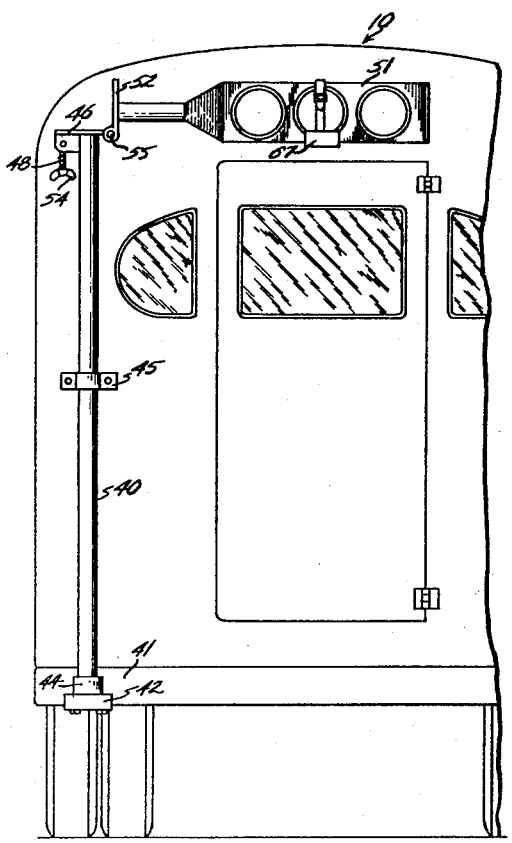
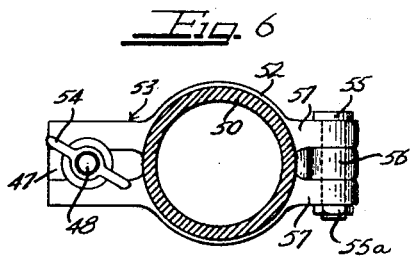
Inventor
Fred S. Martin Patented July 15, 1952

2,603,700

UNITED STATES PATENT OFFICE 2,603,700

PORTABLE TRAFFIC CONTROL LIGHT

Fred S. Martin, Chicago, Ill.

Application December 20, 1948, Serial No. 66,332

7 Claims. (Cl. 177—329)

The present invention relates to a portable traffic control light and more particularly to a traffic control light adapted for mounting on automotive vehicles, such as automobiles, buses, trucks, motorcycles and the like.

Traffic control lights as generally employed are fixedly secured to posts or other supporting means. Various types of directional indicating devices have been proposed for use with automobile vehicles as well as the familiar brake actuated automotive stop light.

However, such automotive traffic control lights are so commonplace and so inconspicuous with relation to the automobile carrying the same that these lights are often ignored or overlooked in operation. The conventional intersection light, on the other hand, is conspicuously displayed and is generally recognized by the motoring public. A type of portable traffic control light similar in design and operation to the conventional intersection lights would be desirable as a conspicuous, instantly recognized, traffic control light for school buses, trucks, and the like. Also, such a portable traffic control light could be employed by law enforcement officers at intersections at which the normal traffic does not warrant the expense of installing and maintaining a permanent traffic cotrol light but which, at rush hours, accommodates a large volume of traffic.

The present invention now provides an improved portable traffic control light in which an intersectional type traffic light may be mounted directly upon the body of an automotive vehicle. The light of the present invention comprises generally a pair of relatively movable members, one of the members being secured to the body of the automotive vehicle to serve as a base member and the second member being carried by this base member for movement relative thereto. The second member carries a traffic control light which can be elevated or otherwise exposed to view beyond the confines of the body of the vehicle. Means are provided for facilitating relative movement of the two members and also for securing the two members in adjusted relation to expose the light to view.

In one preferred embodiment, the portable traffic control light compises a pair of telescoping members, one of which is adapted to be secured to the body of an automotive vehicle. If desired, the device, when in telescoped non-operative position, may be contained entirely within the body of a vehicle such as a bus or a truck. If such is the case an aperture is provided in the body for receiving the telescoping supporting members and the traffic light itself. A contoured plate carried by the device may be provided to close the aperture in the automotive body upon movement of the light to either its exposed or concealed position.

In a second preferred embodiment of the present invention, the relatively movable members carrying the traffic control light are hinged together for movement and means are provided for maintaining the members in adjusted aligned relation with the traffic light projecting beyond the bodily outlines of the vehicle to which it is attached. In this embodiment, the base member may be secured to the body of the vehicle in a position outside of the vehicular body itself, as, for example, to the vehicle bumper. Upon hinged movement of the second member relative to the base member, the light is retained by suitable means against the vehicular body to allow ready transportation of the assembly as a whole.

It is, therefore, an important object of the present invention to provide an improved form of portable automobile control light for mounting upon an automotive vehicle.

It is another important object of the present invention to provide an improved portable traffic control light for automotive vehicles in which a pair of relatively movable members, one of which is secured to the vehicular body, are employed to retain a traffic control light in position upon the vehicle body, the members being adapted for movement to an inoperative position of relatively small overall length so that the device may be concealed or rendered inconspicuous, and to a second extended position at which the light is exposed to the view of traffic for controlling the same.

Another important object of the present invention is to provide a portable traffic control light for automotive vehicles in which a pair of telescoping members, one of which is secured to the body of the vehicle, are employed for carrying a traffic control light and in which means are provided for maintaining the members in adjusted telescopic relation either to expose the light to the view of traffic or to shorten the overall length of said members to conceal the lights or render them inconspicuous.

A still further important object of the present invention is to provide a portable traffic control light for automotive vehicles in which a pair of hinged members, one of which is secured to the body of the vehicle, are employed for carrying a traffic control light, and in which means are provided for maintaining the hinge members in abutting relation to expose the light to the view of traffic and further means are provided for retaining the traffic control light against the body of the vehicle when the hinged members are moved from their abutting relation.

Other and further important objects of this invention will be apparent from the disclosures in the specification and the accompanying drawings.

On the drawings:

Figure 1 is a rear, elevational view of a bus showing a portable traffic control light of the present invention in extended operative position.

Figure 2 is an enlarged, fragmentary sectional view, with parts shown in elevation, taken along the plane II—II of Figure 1 showing the light in retracted position.

Figure 3 is a cross-sectional view showing means for retaining the traffic light in extended operative position.

Figure 4 is a rear, elevational view of a bus showing a modified form of portable traffic control light of the present invention in extended operative position.

Figure 5 is a view similar to Figure 4 showing the light in hinged, inoperative position.

Figure 6 is a cross-sectional view taken along the plane VI—VI of Figure 4.

As shown on the drawings:

In Figures 1 and 2, reference numeral 10 refers generally to a bus or the like automotive vehicle having a body 11 formed of sheet metal, wood or the like material with the roof or upper portion of the body 11 being apertured as at 12 to accommodate a traffic control light of the present invention as hereinafter more fully described.

As best shown in Figure 2, a base member 13 in the form of a cylindrical sleeve 14 is provided with an enlarged lower terminal section 15 secured to floor member 16 of the interior of the body 11 by suitable means, as by bolts 17. The upper extremity of sleeve 14 is slotted as at 18 and a collar 19 having apertured outturned ears 20 encircles the upper slotted portion of the sleeve. Suitable means, such as bolts 21 and nuts 22, extend through the registering apertures 20 urging the collar 19 in tight gripping engagement with the slotted portion of the sleeve. The upper terminal portion of sleeve 14 is provided with a pair of diametrically opposed downwardly extending recesses 23 as best shown in Figure 3.

An elongated movable member 24, preferably in the form of a pipe section or cylindrical rod, is slidably received by sleeve 14 in telescoping relation therewith. Telescoping member 24 is diametrically apertured as at 25, the apertures 25 registering with recesses 23 as shown in Figure 3 to receive pin 26 so that member 24 may be maintained in elevated position as shown in Figure 1.

Member 24 carries at its upper end a traffic signal light 27 comprising a closed casing 28 having a plurality of light sources (not shown) mounted therein and a plurality of colored lenses 29 for each of the light sources as is well known in the art. The upper extremity of casing 28 carries a curved closure plate 30 contoured to the outline of the roof of body 11 and adapted to close the aperture 12 on telescoping of the members 14 and 24 as shown in Figure 2. Plate 30 is supported above casing 28 by suitable supporting means, such as rods 31 secured to casing 28 and plate 30. A second closure plate 32 of substantially the same size and contour of the plate 30 is carried by member 24 and is positioned so as to close aperture 12 when the signal light casing 28 is elevated as in Figure 1.

The electrically operated signal light 27 may be connected to the vehicle battery or generator, or to any other suitable electrical power source through lead wires 33.

Thus it will be seen from the foregoing description the present invention provides a portable traffic control light which is entirely concealed within the body of an automotive vehicle when not in use and which may be extended into operative position by mere telescoping movement of a single member within a sleeve. Positive means are provided for retaining the light in elevated operative position and further means are provided for closing the aperture through which the device extends so as to prevent exposure of the interior of the vehicle to the elements.

It will be appreciated by those skilled in the art that the signal light of the present invention need not be mounted within the body of the automotive vehicle, but may be mounted upon a bumper, fender or other outer portion of the vehicle body in exposed position. Similarly, where space permits, the two-part light structure may be hinged to provide for movement of the upper light-carrying part into its operating position or into an inoperative, less conspicuous position.

Such a hinged construction is shown in Figures 4-6 of the drawings in which reference numeral 10 refers generally to a bus as hereinbefore defined. In this modified form of the invention, a base member 40 is secured to a bumper 41 of the bus by suitable means, as by a flange 42 secured to the bumper by bolts 43, the flange 42 having an upstanding collar 44 surrounding the lower portion of the member 40. The base member 40 is also secured to the body by means of strap 45. The base member 40 is provided with an upper flange 46 carrying a depending portion 47 receiving a toggle bolt 48 pivoted about a pin 49 carried by the flange portion 47.

The second member 50 carries a traffic signal light 51 at its upper end, the signal light 51 being similar to the light 27 hereinbefore described. The member 50 carries at its lower end a flange 52 of corresponding contour to the flange 46, the flange 52 having a bifurcated portion 53 (Figure 6) adapted to overlie the portion 47 of the flange 46. This bifurcated section 47 receives the toggle bolt 48 and a wing nut 54 is adapted to overlie the bifurcated section 53 to bear thereagainst maintaining the flanges 46 and 52 in abutment.

The flanges 47 and 52 are hinged for relative movement about a pin 55 as best shown in Figure 6. The flange 46 is provided with a centrally formed ear 56 projecting outwardly from the flange and the flange 52 is provided with a pair of spaced parallel ears 57 adapted to lie on either side of the ear 56. The ears 56 and 57 are each provided with registering apertures to receive a pivot pin 55, the pin being retained in position by means of a bolt or a nut 55a.

The members 40 and 50 are thus hinged together by means of the pin 55 for relative hinged movement from the position shown in Figure 4 to the position of Figure 5. The light 51 may be secured in position against the body of the vehicle 10 by means of a cupped retaining member 67 secured to the body in position to receive the member 51. A strap 58 is provided to retain the light 51 within its folded position against member 67, as shown in Figure 5, thus maintaining the light against movement.

It will, of course, be understood that various details of construction may be carried through a wide range without departing from the principles of this invention and it is, therefore, not the purpose to limit the patent granted hereon otherwise than necessitated by the scope of the appended claims.

I claim as my invention:

1. A portable traffic control light for automotive vehicles comprising a pair of vertically extending telescoping members, one of said members being adapted to be secured to the body of said vehicle, means maintaining said members in adjusted telescopic relation to project upwardly of said vehicular body and a traffic control light carried by the other of said members for movement therewith, whereby said traffic control light may be extended upwardly beyond the body outlines of said vehicle upon movement of said other member and maintained in said extended position by said means.

2. A portable traffic control light for automotive vehicles comprising a pair of telescoping members, one of which is adapted to be secured to the body of said vehicle and the other of which is adapted for telescoping movement relative to the other of said members, each of said members having registering apertures formed therein adjacent the corresponding ends, means for extending through said registering apertures to maintain said members in adjusted telescopic relation, and a traffic control light carried by said other of said members, whereby said traffic light may be adjusted into position to extend beyond the bodily confines of said vehicle upon movement of said other member.

3. A portable traffic control light for automotive vehicles comprising a sleeve adapted to be secured to a body member of said vehicle, a movable member extending into said sleeve and adapted for telescoping movement therein, said sleeve having slots formed therein adjacent to that terminal portion receiving said member and said member having apertures formed therein for registry with said slots, means for insertion into said registering slots and apertures to maintain said member in adjusted telescopic position, and a traffic control light carried by said movable member and extending beyond said sleeve for movement therewith, whereby said traffic light will be visible beyond the bodily confines of said vehicle upon movement of said member to its adjusted position secured by said means.

4. A portable traffic control light for automotive vehicles having a body portion formed with an aperture therein, and comprising a pair of telescoping members, one of which is adapted to be secured to the body of said vehicles and the other of which is adapted for relative telescoping movement with respect to said one member, means for maintaining said members in adjusted telescopic relation, a traffic control light carried by said other member and adapted to extend through said aperture upon movement of said other member, and a pair of spaced closure plates carried by said other member, one of said plates closing said aperture in which said light is confined within said body and the other of said plates closing said aperture when said light extends beyond said body.

5. A portable traffic control light for automotive vehicles having a closed body portion having an aperture formed therein comprising a sleeve secured to said body, a movable member extending into said sleeve and adapted for telescoping movement therein, means for maintaining said member in adjusted telescopic relation, and a traffic control light carried by said movable member, said sleeve, said member and said light being confined within said body which said member is telescoped within said sleeve and extending beyond the confines of said body when said member is moved to its adjusted telescopic position and secured by said means, a closure plate carried by said light for closing said body aperture when said light is confined within said body, and a second closure plate carried by said member for closing said aperture upon movement of said member to its adjusted position.

6. In a portable traffic control signal, a vehicle body, a base member secured to said body, a directional traffic control lamp, a support member carrying said directional lamp, means connecting said support member to said base member for movement of said support member between a retracted and an extended position, said directional lamp carried by said support member to extend above the vertical profile of said vehicle body when moved from said retracted position, means fixedly orienting said directional lamp in said extended position to cast a light in a fixed direction relative to said vehicle body, and clamping means for locking said directional light in said extended and oriented position.

7. In a portable traffic control signal for a vehicle, a base member for securement to the vehicle, a directional traffic control lamp, a support member carrying said directional lamp, means connecting said support member to said base member for movement of the support member between a retracted and an extended position, means fixedly orienting said directional lamp in said extended position to cast a light in a fixed direction relative to said base member, and clamping means for locking said directional lamp in said extended and oriented position.

FRED S. MARTIN.

REFERENCES CITED

The following references are of record in the file of this patent:

UNITED STATES PATENTS

| Number | Name | Date |
|---|---|---|
| 1,303,147 | Archibald et al. | May 6, 1919 |
| 1,951,431 | Meehan | Mar. 20, 1934 |
| 2,017,499 | Kraus | Sept. 17, 1934 |
| 2,082,905 | Riggs | June 8, 1937 |
| 2,094,514 | Zika et al. | Sept. 28, 1937 |
| 2,167,564 | Fonda | July 25, 1939 |
| 2,199,990 | Godfrey et al. | May 7, 1940 |
| 2,237,536 | Wells, Jr. | Apr. 8, 1941 |